US011042659B2

(12) United States Patent
Dorogoy (10) Patent No.: US 11,042,659 B2
(45) Date of Patent: Jun. 22, 2021

(54) SYSTEM AND METHOD OF DETERMINING TEXT CONTAINING CONFIDENTIAL DATA

(71) Applicant: AO Kaspersky Lab, Moscow (RU)

(72) Inventor: Dmitry S. Dorogoy, Moscow (RU)

(73) Assignee: AO Kaspersky Lab, Moscow (RU)

( * ) Notice: Subject to any disclaimer, the term of this patent is extended or adjusted under 35 U.S.C. 154(b) by 355 days.

(21) Appl. No.: 15/642,659

(22) Filed: Jul. 6, 2017

(65) Prior Publication Data

US 2019/0012476 A1    Jan. 10, 2019

(51) Int. Cl.
*G06F 16/20* (2019.01)
*G06F 21/62* (2013.01)
*H04L 29/06* (2006.01)
*G06F 21/60* (2013.01)
*G06F 16/33* (2019.01)

(52) U.S. Cl.
CPC ........ *G06F 21/6218* (2013.01); *G06F 16/334* (2019.01); *G06F 21/60* (2013.01); *H04L 63/0245* (2013.01); *H04L 63/20* (2013.01)

(58) Field of Classification Search
None
See application file for complete search history.

(56) References Cited

U.S. PATENT DOCUMENTS 7,634,473 B2 * 12/2009 Shibata .................... G06F 16/93
8,856,157 B2 * 10/2014 O'Byrne ............. G06F 21/6227
                                                         707/757
9,129,119 B2 *  9/2015 Burke .................. G06F 21/6245
9,501,654 B1 * 11/2016 Adir ........................ G06F 21/60

2005/0055399 A1    3/2005 Savchuk
2006/0047748 A1 *  3/2006 Kelso ................... H04L 12/1813
                                                         709/204
2011/0145066 A1 *  6/2011 Law .................... G06Q 30/0244
                                                         705/14.54
2014/0164383 A1 *  6/2014 Tang ...................... G06F 16/35
                                                         707/737
2014/0331125 A1 * 11/2014 Tigchelaar ............ G06F 17/211
                                                         715/249
2015/0052059 A1 *  2/2015 Everhart ............. G06F 21/6245
                                                         705/51

FOREIGN PATENT DOCUMENTS

JP          6-259424 A      2/1993
JP         10-269235 A      9/1998
JP        2010-198157 A     9/2010
JP         2011-14010 A     1/2011
WO        2010011188 A1     1/2010

OTHER PUBLICATIONS

Japanese Office Action and translation dated Nov. 20, 2018 from corresponding Japanese Application.

* cited by examiner

*Primary Examiner* — Belix M Ortiz Ditren
(74) *Attorney, Agent, or Firm* — Arent Fox LLP; Michael Fainberg (57) ABSTRACT

Disclosed are systems and methods preventing data loss of confidential data in a computer system. The described technique includes searching text data for one or more keywords, and then calculating a density of keywords in the text data based on the one or more keywords that match the text data. The technique classifies the text data as containing confidential data based on whether the density of keywords exceeds a threshold value. If so, the described systems may block the use of the text data containing confidential data in a variety of ways.

15 Claims, 4 Drawing Sheets

Position: 1712..... l/s
Noise level — 85 db
Side view
Logical information
164
⎫
⎬ 302
⎭
Serial number prefix: A01 102
Weight without package: 14.5 kg
Weight in package: 17.5 kg
Size of package: 740 x 365 x 315 mm
Barcode 5025155006888

Standard package of warranty servicing
5 years warranty for spare parts (or 350000 starts), and 1
...
⎫
⎬ 304
⎭
Card Holder: John J. Cameron Expiration Date: 1/2016 CVV2:
220 5466160153154495199906/14

SYSTEM AND METHOD OF DETERMINING TEXT CONTAINING CONFIDENTIAL DATA

FIELD OF TECHNOLOGY

The present disclosure relates generally to the field of data security, more specifically, to systems and methods for preventing leaks of information by determining text containing confidential data.

BACKGROUND

Due to the recent growing number of cybercrimes and the increasing number of thefts of information, systems preventing leaks of information, sometimes referred to as data loss prevention or data leak prevention (DLP), are increasingly in demand. One of the main problems of DLP systems is preventing leaks of personal and confidential data (text), such as passport data, driver's license data, bank card data, etc.

For the detection of personal and confidential data, usually a method is employed which consists in detecting several key words alongside each other. For example, for a passport this is the word "series" and the serial numbers of the passport, the word "number" and the passport number digits, the word combination "date of issue" and the actual date of issue of the passport, and so forth. However, in practice, certain key words may be absent, the distance between other key words may be large or unpredictable, and the key words themselves may pertain to different types of confidential data. For example, after the word "series" there may come the bar code of a particular product, which may be taken erroneously as the passport number. In this case, the known technique produces a false positive or a false alarm, i.e., the situation when text has been determined to contain confidential data, although in fact that text does not contain confidential data.

Thus, there is a need for data loss prevention techniques that more accurately makes determination of a text containing confidential data and reduces the number of false positives.

SUMMARY

Thus, a system and method is disclosed herein for preventing leaks of confidential information in a computer system. The technical result of the present disclosure includes improving the determination of confidential information in text as compared to the known counterparts by diminishing the number of false alarms.

According to one aspect, a method is provided for preventing data loss in a computer system. The method includes searching text data for a plurality of keywords to determine one or more keywords that match the text data, calculating a density of keywords in the text data based on the one or more keywords that match the text data, and determining that the text data contains confidential data based on whether the density of keywords exceeds a threshold value. The method further includes blocking use of the text data containing confidential data.

In another aspect, calculating the density of keywords in the text data based on the one or more keywords that match the text data further includes determining a number of characters in the matched keywords, determining a total number of characters of the text data, and calculating the density of keywords in the text data as a ratio of the number of characters in the matched keywords to the total number of characters of the text data.

In another aspect, the total number of characters of the text data excludes at least one of whitespace characters and non-alphanumeric characters.

In another aspect, calculating the density of keywords in the text data based on the one or more keywords that match the text data further includes determining a number of matched keywords, determining a total number of words of the text data, and calculating the density of keywords in the text data as a ratio of the number of matched keywords to the total number of words of the text data.

In another aspect, the density of keywords in the text data is calculated based on a weighting factor associated with each matched keyword.

In another aspect, a value of the weighting factor of a first matched keyword depends on a number of occurrences of a second matched keyword in the text data.

In another aspect, the method further includes dividing the text data into a plurality of subtexts of a first length, and calculating a respective density of keywords for each of the subtexts.

According to another exemplary aspect, a system for preventing data loss in a computer system is provided. The system includes a memory device, and at least one processor. The processor is configured to: search text data for a plurality of keywords to determine one or more keywords that match the text data, calculate a density of keywords in the text data based on the one or more keywords that match the text data, and determine that the text data contains confidential data based on whether the density of keywords exceeds a threshold value. The processor is further configured to block use of the text data containing confidential data.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for preventing data loss in protected computer systems. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
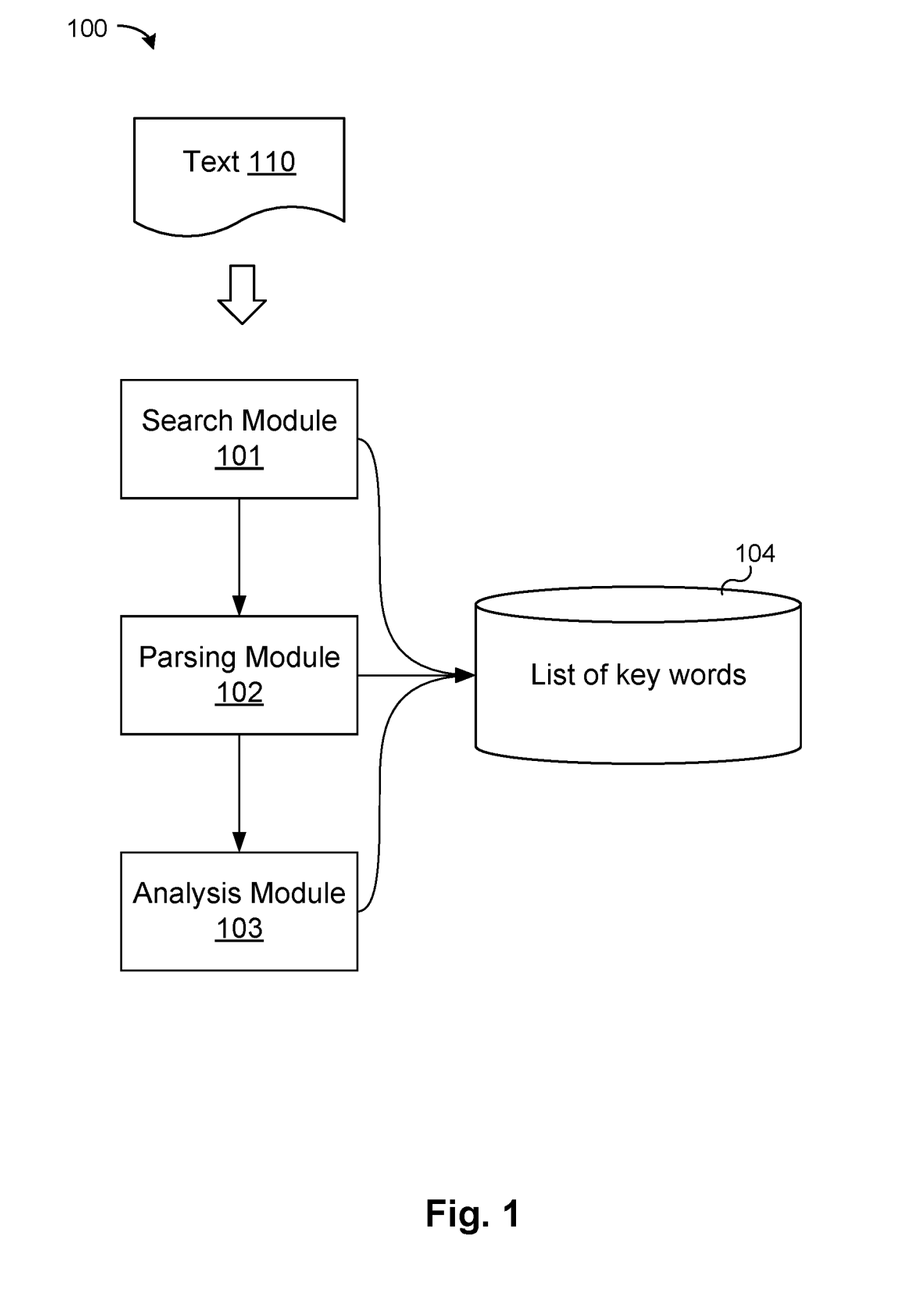
FIG. 1 is a block diagram illustrating a system for prevent information leaks according to certain aspects of the present disclosure.

FIG. 1 is a block diagram illustrating a system 100 for prevent information leaks according to certain aspects of the present disclosure. The system 100 contains a search module 101 configured to search for key words in text 110 being analyzed. In a particular aspect, the text 110 being analyzed may be source text or a portion of a source text, obtained for example from a user or an application, read from a file on disk, or obtained from an email intercepted from network traffic, recognized in an image or extracted from a file format structure. The text 110 being analyzed may contain any given characters. The key word may be any given sequence of characters. In one aspect, the key word is a string containing at least one character. In another aspect, the key word is a regular expression or mask that specifies a search pattern for a sequence of one or more characters. In yet another aspect, the key word is a regular expression that is also made up of other key words. For example, the words A, B, C may be on the list of key words. The regular expression "A?B" may also be a key word, where the character "?" means any character between the words A and B.

The key words are contained in a list of key words 104, which may be obtained from another system or pre-determined, for example, by an expert or system administrator. In an aspect, the list of key words 104 is contained in a database. In certain aspects, the list of key words 104 may be formulated automatically with the use of classification systems. For example, a classification system may analyze a collection of known texts containing confidential data and a collection of known texts not containing confidential data. With the use of classification algorithms, the system picks out key words which are characteristic of the texts containing confidential data, and those which are characteristic of the texts not containing confidential data.

The search module 101 carries out a search for key words in the text being analyzed. A parsing module 102 is configured to calculate the density of key words in the text being analyzed. In some aspects, the parsing module 102 may calculate the density of key words based on a ratio of the number of characters in the key words found to the number of characters of the text being analyzed. In other aspects, the parsing module 102 may calculate the density of key words based on a ratio of the number of key words found to the total number of words of the text being analyzed.

In one aspect, the calculation of the number of characters of the text being analyzed in the aforementioned expressions might refrain from considering certain characters (i.e., might not take certain characters into account), such as the space character, other whitespace characters, non-alphanumeric characters, control characters, the characters of punctuation marks, special characters, multiple repeating characters, and any other characters. The density of key words may for example be represented by real, integer, or rational values. The values of the density of key words may be in a limited set, for example, in the range of 0 to 1.

The system 100 further includes an analysis module 103 configured to determine a text being analyzed as one which contains confidential data if the density of key words is greater than a threshold value (such as 0.5 of the maximum possible value of the density of key words). In some aspects, the threshold value depends in particular on one of: the number of characters of the text being analyzed; the number of words of the text being analyzed. For example, for a short text the threshold value is lower than for a long text.

It should be noted that the results of the determination of a text being analyzed as one which contains confidential data may take other systems into account. For example, the data leak prevention system may forbid the sending of text data determined as being one which contains confidential data outside of a network perimeter. An access control system may forbid access by specified users to a text determined as being one which contains confidential data.

In certain aspects, each key word is associated with a weighting factor which is taken into account when calculating the density of key words: if the value of the weighting factor for a key word which is contained in the text being analyzed is greater than one unit, the density of the key words is increased; otherwise, it is decreased. Thus, in a particular aspect, the density of key words may be calculated as the ratio of sum of the number of characters in each key word (found in the text being analyzed) multiplied by its weighting factor to the number of characters of the text being analyzed. For example, the density score may be calculated using the relationships represented by Equation (1) below:

$$\text{density\_score} = \frac{\sum (n_i * w_i)}{n_{total}}, \quad (1)$$

where "i" is an index of a found key word, "$n_i$" is a number of characters in the ith key word, "$w_i$" is a weighting factor of the ith key word, and "$n_{total}$" is equal to the total number of characters in the entire text being analyzed.

In some aspects, key words having equivalent, similar, or related meanings may be assigned weighting factors such that they have an identical contribution to the density of key words: multiplication of the number of characters in key word and its weighed factor should be the same for all key words with identical contribution. For example, the list of key words 104 may contain words such as "RF" and "Russian Federation" which denote one and the same thing and therefore should equally influence the calculating of the density of key words. As such, the first key word "RF" (i=1, $n_1$=2) and the second key word "Russian Federation" (i=2, $n_2$=19) should have a same contribution to the density score. Assuming the use of Equation (1) above, the values of ($n_1*w_1$) should be equal to ($n_2*w_2$) for these two keywords, and substituting the number of characters in the respective key words yields the relationship ($2*w_1$)=($19*w_2$). If we assign $w_2$ the value of 1, then $w_1$ should equal $19*½$=9.5 Therefore, the word combination "Russian Federation" may be assigned a weighting factor of 1, and then the word "RF" may be assigned a weighting factor of 9.5. Again, the number of characters in the key word being analyzed, multiplied by the weighting factor for this key word, will be equal to the very same number—19 for the indicated key words.

In yet another aspect, the weighting factor for one key word may depend on the number of occurrences of another key word in the text being analyzed. For example, if the number of occurrences of the key word B in the text being analyzed is greater than zero (one, two, three or more), then the weighting factor of the key word A is equal to 1. But if the number of occurrences of the key word B in the text being analyzed is equal to zero (i.e., the key word B is not encountered in the text being analyzed), then the weighting factor of the word A is equal to 0. In this example, the key word A may be "passport", for example, and the key word B may be the passport number (the key word corresponds to the passport format). In this example, if only the key word A "passport" is present in the text being analyzed, but no sequence of numbers meeting the requirements for a passport number is present, then the mere presence of the key word "passport" does not indicate that the text being analyzed is confidential. Therefore, the weighting factor of the word "passport" will be equal to zero, and this word does not influence the calculation of the density of key words.

In one aspect, the search module 101 is additionally used to perform a check on the key words found for compliance with given criteria, one criterion being in particular the performance of a check with the aid of the Luhn algorithm or formula on the key words found and corresponding to a bank card number. In some aspects, the mentioned criteria may be contained on a list of criteria in a file on a computer. Key words from the list of key words 104 corresponding to passport data are checked for compliance with specified formats of passport data and so forth. In yet another aspect, such criterion may be the checking of a regular expression for its correctness. For example, if the regular expression corresponds to data, the check for correctness may be a check for the correctness of existence of that data. In this example, the data 32.01.2017 is an incorrect date, for example.

Figure 2:
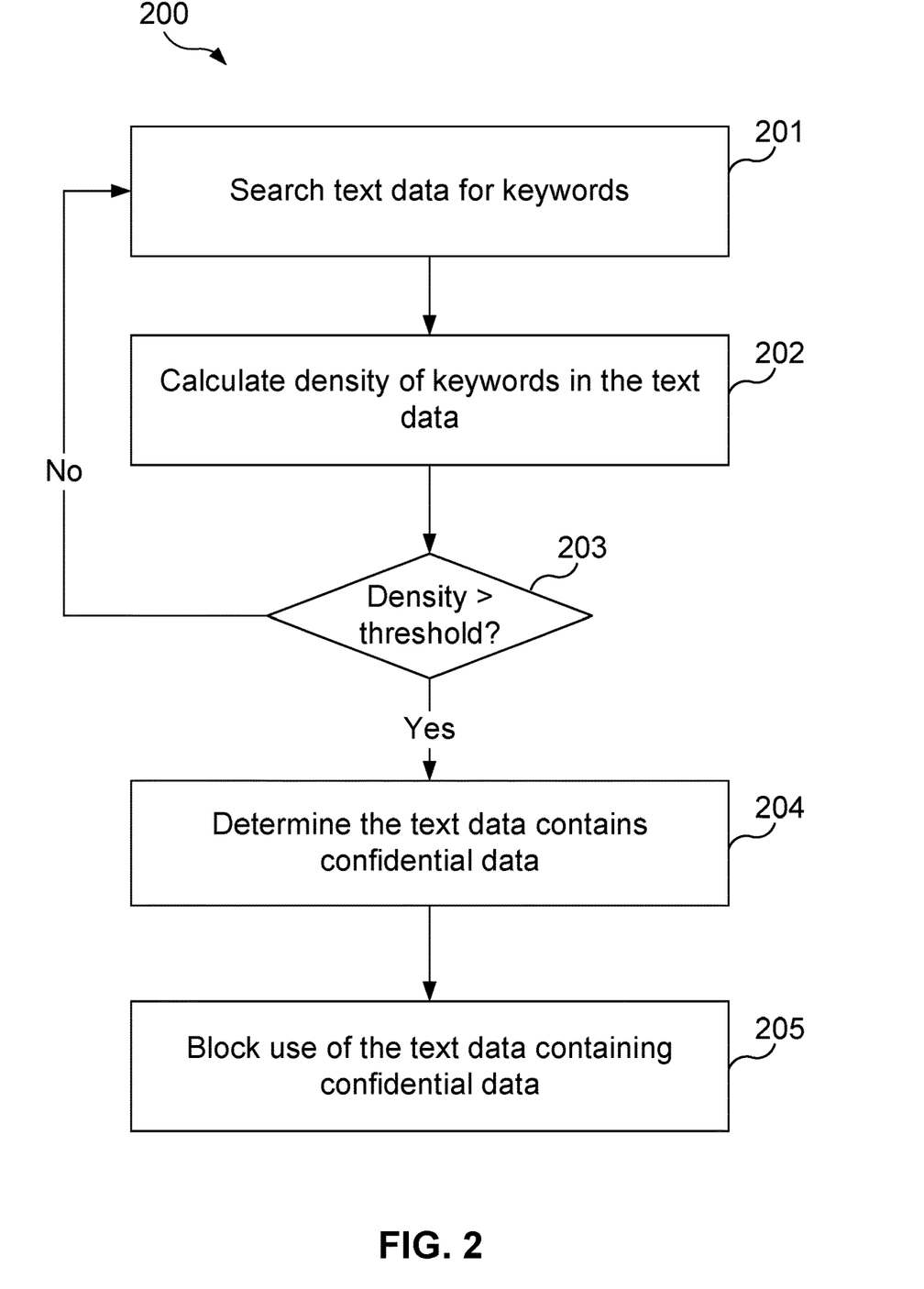
FIG. 2 is a flowchart illustrating a method of determining text containing confidential data according to an exemplary aspect.

FIG. 2 is a flowchart illustrating a method 200 of determining text containing confidential data according to an exemplary aspect. In the first step 201, the search module 101 performs a search for key words in the text 110 being analyzed to determine one or more keywords that match the text data.

Next, in step 202, the parsing module 102 calculates the density of key words in the text being analyzed based on the one or more keywords that match the text data (i.e. text being analyzed). In some aspects, the parsing module 102 determines a number of characters in the matched keywords, determines a total number of characters of the text data, and then calculates the density of key words as the ratio of the number of characters in the key words found to the number of characters of the text being analyzed. In some aspects, the total number of characters of the text data excludes at least one of whitespace characters and non-alphanumeric characters. In other aspects, the parsing module 102 determines a number of matched keywords, determining a total number of words of the text data, and calculates the density of keywords as the ratio of the number of key words found to the total number of words of the text being analyzed. In some aspects, the text data is divided into a plurality of subtexts of a first length, and the parsing module 102 calculates a respective density of keywords for each of the subtexts. In some aspects, the parsing module 102 calculates the density of keywords in the text data based on a weighting factor associated with each matched keyword. In some aspects, a value of the weighting factor of a first matched keyword depends on a number of occurrences of a second matched keyword in the text data.

As a result, in step 203, the analysis module 103 determines whether the calculated density of keywords exceeds a specified threshold value. If not, operations may return to step 202 in which the search module 101 may search for keywords in more text data, i.e., in another portion of text 110. Otherwise, at step 204, the analysis module 103 may determine that the text being analyzed is one which contains confidential data if the density of key words exceeds a specified threshold value.

In step 205, in response to determining the text data contains confidential data, the system 100 may block the use of the text data, depending on the source of the text 110. For example, if the text data was received from an endpoint system as "data in use," the system 100 may block the text data from being shared between groups or types of users, e.g., via e-mail or messaging communications. In another example, the system 100 may block the text data from being used in screen-capture operations, copy/paste operations, print/fax operations, and file transfer operations (e.g., to a USB drive). In some aspects, if the text data was intercepted ("data in motion") across network traffic, the system 110 may block network traffic containing the text data from being routed to its destination, or may modify the network traffic to remove the confidential data. In one aspect, such as in cases where the text data 110 was retrieved from data storage (i.e., data archives), system 110 may flag the text data as containing confidential data, which then triggers certain procedures for storing, handling, and even disposing of the text data. In some aspects, the system 100 may modify the text data 110 using data obfuscation prior to providing it to the application. The mode of modification may vary depending on the type of application using the text data 110. In other aspects, the system 100 may nevertheless allow the text data 110 being used based on an allowed list of applications, such as a whitelist, that overrides the blocking step.

It should be noted that in one aspect the text being analyzed is a source text obtained from a user or an application, or other sources as was indicated in the description of FIG. 1. In another aspect, the text being analyzed may be part of the aforementioned source text of a defined length.

In some aspects, the source text may be broken up into several subtexts of given length. For example, the source text has a length of 1000 characters, the first subtext analyzed starts from character 1 and has a length of 100 characters, the second subtext analyzed starts from 2 characters and has a length of 100 characters, and so forth. In this example, the method in steps 201-204 may be applied several times to each subtext being analyzed.

Figure 3:
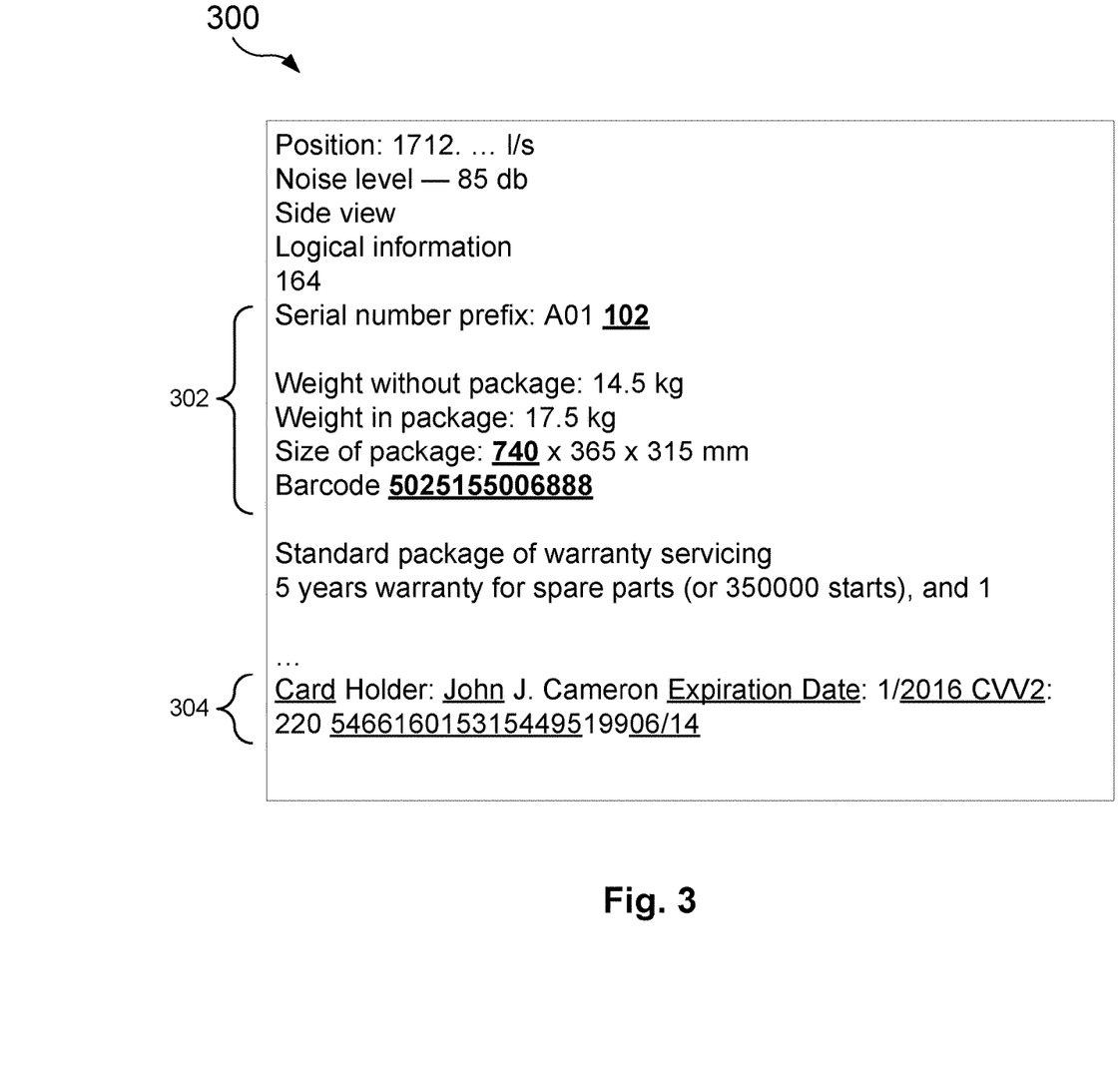
FIG. 3 presents an example of text which contains key words, but is not confidential.

FIG. 3 presents an example of text data 300 which contains key words, yet is not confidential. In this example, an instruction to an electronic device is given. As shown, the text data 300 contains key words (shown as underlined text) which when joined together will correspond to a bank card number. For example, the keywords "740" and "5025155006888" in the portion 302 taken together might appear to correspond to a bank card number. Thus, the majority of existing methods for discovering text containing confidential data might cause a false alarm and accept the indicated text as being text which contains confidential data, namely, a bank card number.

However, it should be pointed out that the number of key words and their length in relation to the entire analyzed text 300 is small. For this very reason, a new approach is proposed in the present disclosure, which includes the calculation and analysis of the density of key words. The approach proposed in the present disclosure will not trigger a false alarm in the indicated text example (or in other similar texts) and will not determine the given text as being one which contains confidential data on account of the low density of key words. Thus, the use of the method declared in the invention will solve the mentioned technical problem involving false alarms occurring in the determination of a text which contains confidential data, and will accomplish the declared technical result, namely, it will improve the determination of confidential information in a text as compared to the known counterparts thanks to decreasing the number of false alarms.

Let us assume that the expression for calculating the density of key words is the ratio of the number of characters in the key words found to the number of characters of the text being analyzed, as was mentioned previously in a particular sample embodiment. Let the specified threshold value be equal to 0.5, beyond which the text being analyzed will be determined as being one which contains confidential data (step 203). Let us consider two variants of the text being analyzed.

In a first example, the search module 101 may perform a search on text No. 1 (depicted as portion 302 in the example of FIG. 3), which reads:

"102 Weight without package: 14.5 kg Weight in package: 17.5 kg Dimensions of package: 740×365×315 mm Barcode 5025155006888"

The key words found in step 201 are underlined in the text. The correctness of the bank card number found (in the given example, 740 502515500688) can be checked with the aid of the Luhn algorithm by the search module 101 in step 201. In this case, the parsing module 102 determines the number of characters in the key words (19 characters) and the number of characters in the text being analyzed (110 characters, including blank spaces). The parsing module 102 then calculates the density of key words calculated in step 202 is equal to 0.17 (i.e., 19/110=0.1727). The density of key words is below the specified threshold value of 0.5 (0.17<0.50) and therefore the analyzed text No. 1 will not be determined as one which contains confidential data in steps 203-204.

In a second example, the search module 101 may search the text No. 2 (depicted as portion 304 in FIG. 3):

"Card Holder: John J. Cameron ExpirationDate: 1/2016CVV2: 220 5466160153154495199906/14"

Again, the key words found in step 201 are underlined in the text. In this case, the density of key words is equal to 0.62 (54 characters in keywords/87 characters including spaces=0.62) and is greater than the specified threshold value of 0.5, so that the analyzed text No. 2 will be determined as being one which contains confidential data in step 203.

Figure 4:
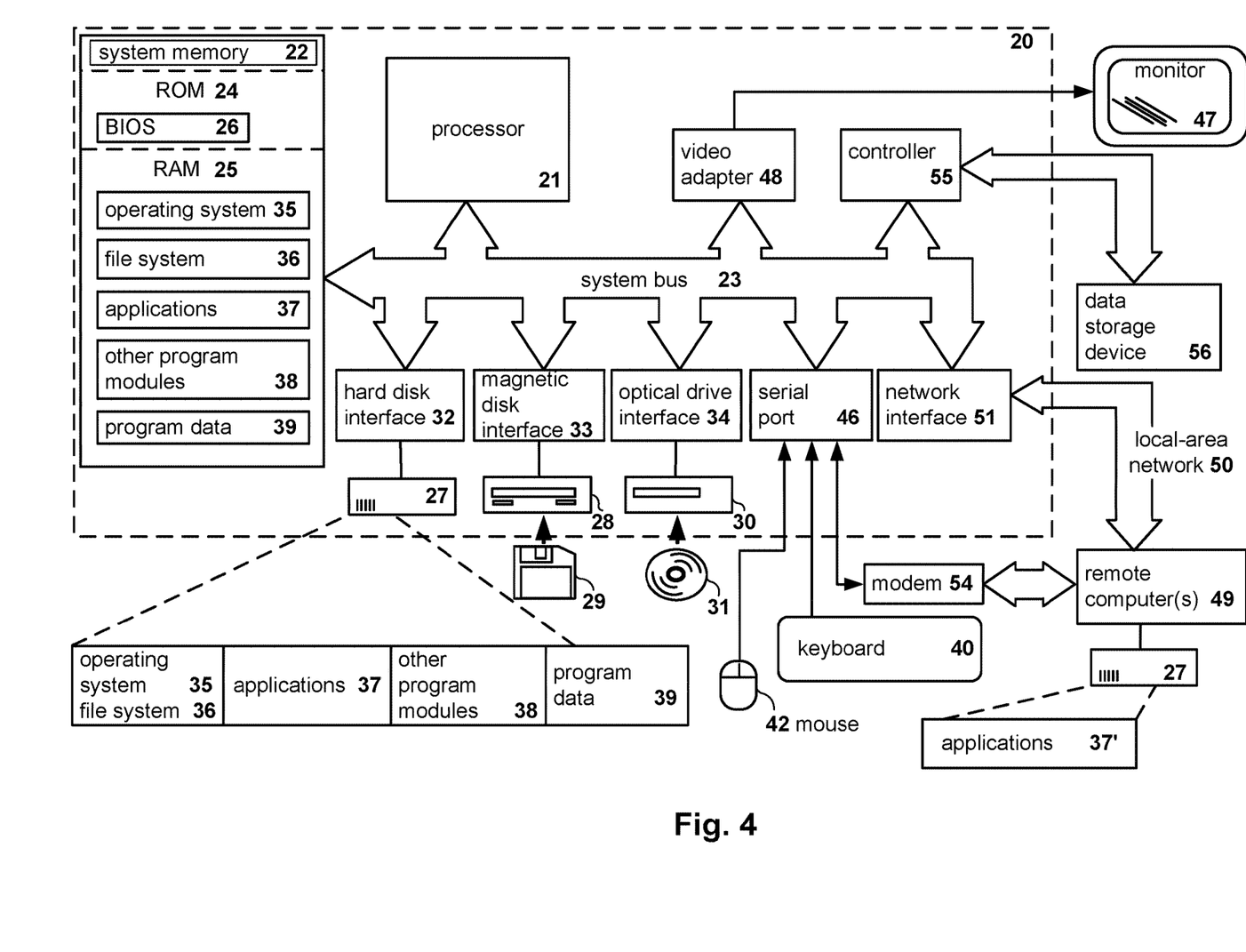
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for preventing information leaks may be implemented in accordance with an exemplary aspect. It should be noted that the computer system 20 can correspond to the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in Fig., above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing data loss in a computer system, wherein the method comprises:
   receiving and searching text data for a plurality of keywords to determine one or more keywords that match the text data;
   calculating a density of keywords in the text data based on the one or more keywords that match the text data, wherein the density of keywords is calculated based on a weighting factor associated with each matched keyword, a number of characters in the keyword, and a number of characters of the text data;
   determining that the text data contains confidential data based on whether the density of keywords exceeds a threshold value;
   blocking use of the text data containing confidential data from being used in screen- capture, copy and paste, print and fax, and file transfer operations; and
   overriding the blocking by allowing a use of the text data only by applications in a whitelist and by modifying the text data using data obfuscation prior to providing the data to the application.

2. The method of claim 1, wherein the total number of characters of the text data excludes at least one of whitespace characters and non-alphanumeric characters.

3. The method of claim 1, wherein calculating the density of keywords in the text data based on the one or more keywords that match the text data further comprises:
   determining a number of matched keywords;
   determining a total number of words of the text data; and
   calculating the density of keywords in the text data as a ratio of the number of matched keywords to the total number of words of the text data.

4. The method of claim 1, wherein a value of the weighting factor of a first matched keyword depends on a number of occurrences of a second matched keyword in the text data.

5. The method of claim 1, further comprising:
   dividing the text data into a plurality of subtexts of a first length; and
   calculating a respective density of keywords for each of the subtexts.

6. A system for preventing data loss in a computer system, wherein the system comprising:
   a memory device; and
   at least one processor configured to:
      receive and search text data for a plurality of keywords to determine one or more keywords that match the text data;

calculate a density of keywords in the text data based on the one or more keywords that match the text data, wherein the density of keywords is calculated based on a weighting factor associated with each matched keyword, a number of characters in the keyword, and a number of characters of the text data;

determine that the text data contains confidential data based on whether the density of keywords exceeds a threshold value;

block use of the text data containing confidential data from being used in screen- capture, copy and paste, print and fax, and file transfer operations; and overriding the blocking by allowing a use of the text data only by applications in a whitelist and by modifying the text data using data obfuscation prior to providing the data to the application.

7. The system of claim 6, wherein the total number of characters of the text data excludes at least one of whitespace characters and non-alphanumeric characters.

8. The system of claim 6, wherein the processor configured to calculate the density of keywords in the text data based on the one or more keywords that match the text data is further configured to:

determine a number of matched keywords;

determine a total number of words of the text data; and calculate the density of keywords in the text data as a ratio of the number of matched keywords to the total number of words of the text data.

9. The system of claim 6, wherein a value of the weighting factor of a first matched keyword depends on a number of occurrences of a second matched keyword in the text data.

10. The system of claim 6, wherein the processor is configured to:

divide the text data into a plurality of subtexts of a first length; and calculate a respective density of keywords for each of the subtexts.

11. A non-transitory computer readable medium comprising computer executable instructions for preventing data loss in a computer system, including instructions for:

receiving and searching text data for a plurality of keywords to determine one or more keywords that match the text data;

calculating a density of keywords in the text data based on the one or more keywords that match the text data, wherein the density of keywords is calculated based on a weighting factor associated with each matched keyword, a number of characters in the keyword, and a number of characters of the text data;

determining that the text data contains confidential data based on whether the density of keywords exceeds a threshold value;

blocking use of the text data containing confidential data from being used in screen- capture, copy and paste, print and fax, and file transfer operations; and overriding the blocking by allowing a use of the text data only by applications in a whitelist and by modifying the text data using data obfuscation prior to providing the data to the application.

12. The non-transitory computer readable medium of claim 11, wherein the total number of characters of the text data excludes at least one of whitespace characters and non-alphanumeric characters.

13. The non-transitory computer readable medium of claim 11, wherein the instructions for calculating the density of keywords in the text data based on the one or more keywords that match the text data further comprises instructions for:

determining a number of matched keywords;

determining a total number of words of the text data; and calculating the density of keywords in the text data as a ratio of the number of matched keywords to the total number of words of the text data.

14. The non-transitory computer readable medium of claim 11, wherein a value of the weighting factor of a first matched keyword depends on a number of occurrences of a second matched keyword in the text data.

15. The non-transitory computer readable medium of claim 11, further comprising instructions for:

dividing the text data into a plurality of subtexts of a first length; and calculating a respective density of keywords for each of the subtexts.

* * * * *